United States Patent [19]
Pelton et al.

[11] 3,881,167
[45] Apr. 29, 1975

[54] METHOD AND APPARATUS TO MAINTAIN CONSTANT PHASE BETWEEN REFERENCE AND OUTPUT SIGNALS

[75] Inventors: Charles R. Pelton; Kim L. Mitchell; David H. Gauger, all of Ponca City, Okla.

[73] Assignee: Pelton Company, Inc., Ponca City, Okla.

[22] Filed: July 5, 1973

[21] Appl. No.: 376,465

[52] U.S. Cl. ............. 340/15.5 TC; 340/15.5 TA
[51] Int. Cl. .................................................. G01v 1/00
[58] Field of Search ............. 340/15.5 DP, 15.5 TA, 340/15.5 TC; 181/.5 VM, .5 EC, 113

[56] References Cited
UNITED STATES PATENTS

| | | | |
|---|---|---|---|
| 3,289,154 | 11/1966 | Cunningham | 340/15.5 TA |
| 3,307,648 | 3/1967 | Masterson | 340/15.5 TA |
| 3,307,649 | 3/1967 | Ball et al. | 340/15.5 TA |
| 3,319,221 | 5/1967 | Ball et al. | 340/15.5 TA |
| 3,460,648 | 4/1969 | Brown et al. | 340/15.5 TA |
| 3,698,508 | 10/1972 | Landrum, Jr. | 181/.5 EC |
| 3,733,584 | 5/1973 | Pelton et al. | 181/.5 VM |

*Primary Examiner*—Maynard R. Wilbur
*Assistant Examiner*—T. M. Blum

[57] ABSTRACT

A control system for an electro-hydraulically driven vibrator for the purpose of maintaining a constant phase relation between the output signal of the vibrator, passing into the earth, and a reference signal being used to drive the vibrator. The system operates on a digital basis and provides two digital sweep signal generators, each of which provides a train of time spaced voltage pulses of selected magnitude, in accordance with a corresponding train of timespaced time-words signals. One of these is a reference sweep signal generator and has a continuous application of time-words. The second is designed so that the sequence of time-words signals can be modified, that is, time-words are advanced or retarded, thereby effectively shifting the phase of the second, or driver signal generator, with respect to the first, or reference signal generator. The driver signal is used to control an electro-hydraulic vibrator. Feedback signals are provided from the output of the vibrator. These are compared with the reference signal and the result used to provide a feedback error signal, which controls the sequence of time-word signals which are sent to the driver generator. Thus, the two trains of output pulses, from the two generators, are relatively shifted in instantaneous phase, in accordance with the feedback error signal, by the shifting of the time-word sequence to the driver generator.

21 Claims, 9 Drawing Figures

METHOD AND APPARATUS TO MAINTAIN CONSTANT PHASE BETWEEN REFERENCE AND OUTPUT SIGNALS

CROSS REFERENCES TO RELATED APPLICATIONS

This application is related to the following copending application assigned to the same assignee as this application, and filed Nov. 10, 1971, Ser. No. 197,254, entitled: Servo Hydraulic Vibrator With Phase Error Correction. To the extent of their relation, Ser. No. 197,254, now U.S. Pat. No. 3,854,118, is incorporated into this application by reference. This application is also related to U.S. Pat. No. 3,739,870, assigned to the same assignee. U.S. Pat. No. 3,739,870 is incorporated into this application by reference.

BACKGROUND OF THE INVENTION

This invention is in the field of electrically controlled vibrators. More specifically it is in the field of electromechanical or electro-hydraulic vibrators, of high power output, which are used in the geophysical exploration industry for generating elastic wave signals in the earth. Still more specifically this invention relates to a method of controlling the phase of the output signal from the vibrator to maintain a constant phase relation with the reference signal. It concerns altering the phase of the driver sweep signal sent to the electro-hydraulic vibrator in order to maintain a constant phase relation on the output of the vibrator with respect to the reference signal.

The prior art is represented by the patent to J. R. Cole, issued in 1965, U.S. Pat. No. 3,219,971. In this patent it is taught that it is desirable to maintain the output signal from the vibrator, that is, the elastic wave signal in the earth, in constant phase relation with the reference sweep signal, so that when correlation is later made between the received signals and the reference signal, more precise travel time measurements can be obtained. In this patent it is taught that a function of the output signal from the vibrator is multiplied by the reference signal in order to determine any change of phase between the two. Such change of phase provides an output error signal after integration which is used to phase shift the driver signal to the vibrator in order to restore to the output the proper phase with respect to the reference signal.

All prior art control systems follow basically this feedback arrangement. Also, all of the prior art systems operate in the analog area, that is, the reference sweep signal is an analog signal or use a digital memory for phase shift control.

SUMMARY OF THE INVENTION

It is a primary object of this invention to provide a control system for an electrically controlled geophysical vibrator, in which the reference signal and the "phase shifted" reference signal, which is used as the driver signal, are generated digitally and later converted to analog form. In this system the phase shifting of the driver signal with respect to the reference signal is done in the digital area rather than as, in the prior art, in the analog area. These sweep signals are generated digitally, that is, a train of voltage pulses of different selected amplitudes are formed at equally spaced time intervals, in response to a corresponding train of digital words, which are called time-words. The train of individual pulses is a function of the individual time-words. By advancing the time-word number, that is, presenting a later time-word number to the calculator that produces the pulses, in effect, advances the time function which is generated. Conversely, delaying the time-word number, that is, applying an earlier time-word to the generator, will provide an earlier value of the train, and therefore will delay the phase of the train with respect to another reference generator in which the time-words are not advanced or delayed.

This is the essence of the invention and can be summarized as follows: Two digital time functions are generated by providing a computer with a series of time-words and a pre-selected program, so that for each individual time-word there is a voltage pulse of selected amplitude. One generator provides a continuous reference sweep signal. The second generator provides a driver signal, which if it had a continuous uninterrupted time-word train applied to, it would provide an identical reference signal. The vibrator provides an output signal which is compared to the reference signal, to provide a comparison signal. This comparison signal provides an output error signal, which is used to advance or delay the time-word train of the driver generator. The digital output of the driver generator passes through a D/A converter. This provides an analog sweep signal to the vibrator which is advanced or delayed in phase in accordance with the error signal.

BRIEF DESCRIPTION OF THE DRAWINGS

These and other objects of this invention and a better understanding of the principles and details of the invention will be evident from the following description taken in conjunction with the appended drawings, in which.

DESCRIPTION OF THE PREFERRED EMBODIMENTS

Figure 1:
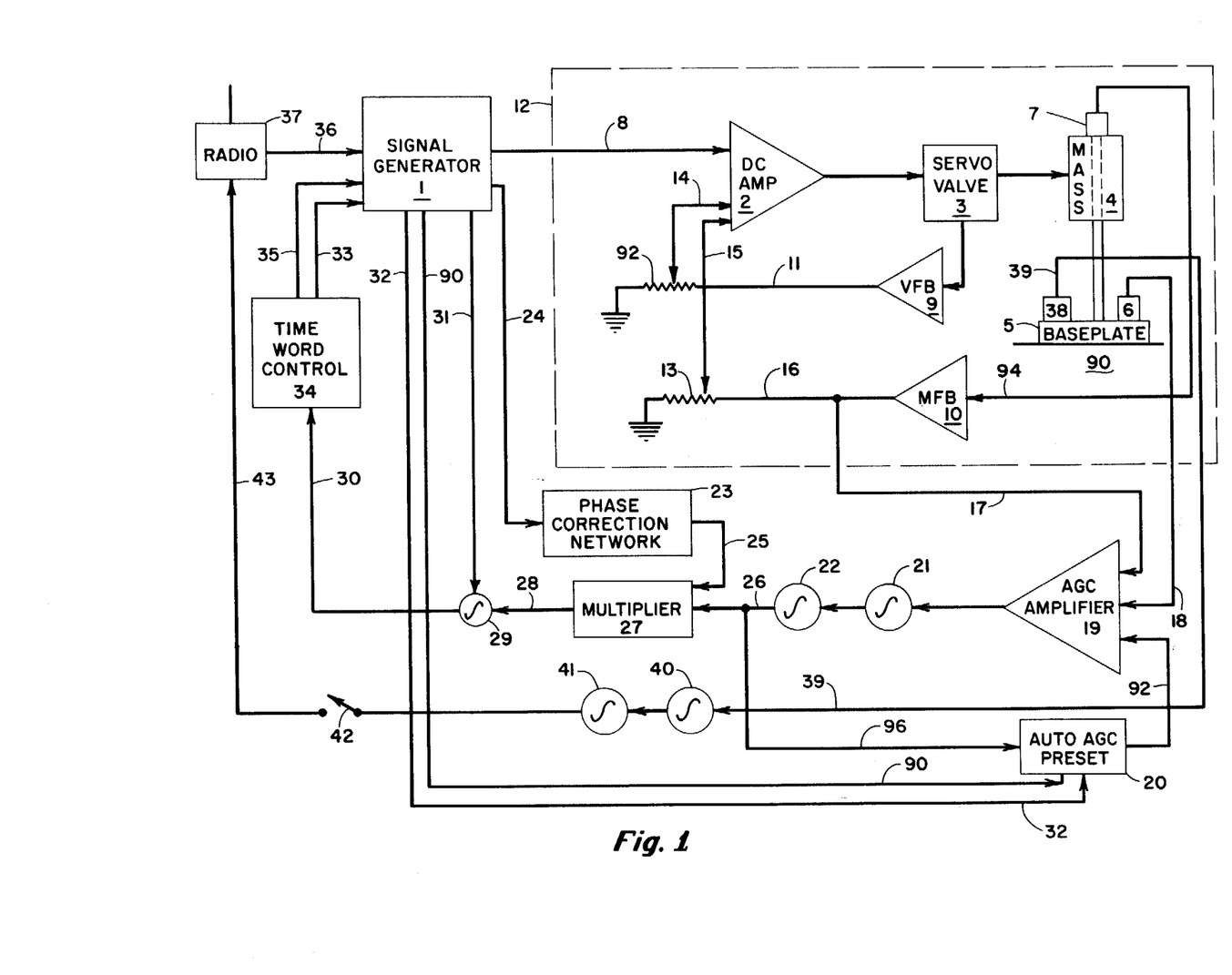
FIG. 1 represents an overall circuit diagram of the vibrator control circuit of this invention.

Referring now to the drawings and in particular to FIG. 1.

In accordance with the method of the present invention the base plate of the vibrator is driven to maintain a constant phase relation between an output signal and a reference signal that has been generated. A first reference sweep signal is generated in a portion of this invention and has been previously described in U.S. Pat. No. 3,739,870. A second similar sweep signal, the driver signal, is generated simultaneously to supply the driving sweep signal to the vibrator control electronics. The second driver signal will be generated to be different in phase from the first reference signal as is required, to maintain the proper phase of the base plate with respect to the reference signal, in accordance with an error signal developed for each cycle of the reference signal by a phase error detector network.

In FIG. 1 the vibrator system is indicated by the dashed line 12. This includes a power amplifier 2 which drives a servo hydraulic valve 3, which drives the piston of the vibrator with reference to the mass 4 as is well known in the art. The piston is connected to a base plate 5 which rests on the earth 90. On the base plate 5 are sensors 6 and 38, and on the mass-piston system of the vibrator is a sensor 7 all of which give information regarding the movement of the base plate with respect to the mass, and the movement of the base plate with respect to the earth. Sensor 6 or sensor 7, or both sensors can be combined into an amplifier 19 which is representative of a function of the signal going into the earth 90 from the base plate 5. If the sensor records a quantity which is a function of the acceleration of the base plate, it is then desirable after amplification to integrate in two stages 21 and 22, as is well known, to provide a signal at output line 26 which should correspond, at least in fundamental frequency, with the sweep signal, which is generated by the signal generator 1. This reference signal goes by way of line 24 to a phase correction network 23 to compensate for the imperfectness of integrators 21 and 22. These two signals on lines 25 and 26 go to a multiplier 27 where they are continuously multiplied. The product goes by way of line 28 to an integrator 29 of special design, to provide a DC signal on line 30, the polarity of which depends on whether the base plate lags or leads, in phase, the reference signal. This signal on line 30 is called the output feedback error signal and goes to the time-word control 34. The time-word control 34 and the signal generator 1 will be described in more detail to follow.

Within the dashed boundary 12, which represents the vibrator, there is a feedback from the sensor 7 through an amplifier 10, the output of which on line 16 goes through a potentiometer 13 to ground. The slider on the potentiometer goes as a control on the power amplifier 2. Similarly there is a feedback from the servo valve 3 through amplifier 9 and line 11 to potentiometer 92 to ground. The slider of potentiometer 92 goes by line 14 as an additional control on the power amplifier 2. The two feedbacks through lines 11 and 16 and potentiometers 92 and 13 respectively, provide a means for maintaining a minimum phase error between the output of the vibrator and the sweep signal provided by line 8 to the amplifier 2.

However, there is more than the vibrator itself that has an effect on its relative phase with respect to the reference signals. Because the vibrator itself is in contact with the earth, and is operating against the earth, and depending on the kind of restraint that it finds, its phase will vary with respect to the driving signal, in addition to the effects of mass-inertia and other facts within the vibrator system itself. The equipment inside the dashed line 12 is more or less conventional in the general categories shown. The new features of this invention lie primarily in the signal generator in the time-word control, in the integrator 29, and in the automatic AGC preset 20 and other parts which will be described in more detail to follow.

Shown in FIG. 1 is a connection, line 17 between conductor 16 and an input to the accelerometer amplifier 19. Although any type of sensor, 6 and 7, can be used with appropriate associated apparatus, it is a preferred system to use an accelerometer on the base plate and a displacement sensor 7 showing the relatively displacement between the piston and the mass 4 of the vibrator. These signals go by way of lines 18 from the accelerometer directly to the accelerometer amplifier 19 and by line 94 from the sensor 7 through amplifier 10 to line 16 then via line 17 to the accelerometer amplifier 19. These connections provide the control for the amplifier 19, that is, the feedback control for the amplifier, to be some combination of the outputs of the two sensors, the accelerometer sensor 6 and the displacement sensor 7. It is possible, as shown in the copending application Ser. No. 197,254, that one sensor 7 can be used for a low frequency range and another 6 for a high frequency range, or the sum of the two sensors, 6 and 7, can be used as the control for the feedback signal. The output of the accelerometer amplifier 19 is twice approximately integrated to provide a signal on line 26 which corresponds approximately to the displacement of the base plate 5.

At a predetermined time after the signal generator 1 is activated a command will be sent to the auto AGC preset module 20 by a lead 32. At this time AGC voltage that is developed by the signal sampled by line 96 from line 26 is held in memory in the AGC preset 20. At the end of the sweep cycle the memory voltage is applied to the AGC preset for the purpose of setting the initial gain of the accelerometer amplifier 19. At the beginning of the next cycle the AGC memory, or preset voltage, is released from the AGC control, allowing the AGC to function on the accelerometer amplifier output signal. This procedure is repeated with each sweep cycle. The AGC auto preset 20 will be described later in relation to FIG. 4. What the auto AGC preset does is to provide a present gain setting for the accelerometer amplifier at the beginning of the sweep. This preset gain setting is based on the previous sweep and serves to control the amplifier in the early part of the sweep where it would not otherwise have an adequate control signal.

The purpose of the phase correction network 23 is to compensate for any phase error created by the imperfectness of integrators 21 and 22. The phase of the correction network 23 is initially set such that if the same signal were introduced to the accelerometer amplifier 19 and phase correction network 23, the output as seen on lines 26 and 25 would be exactly 180° at all frequencies.

The output of the multiplier 27 is fed to a single cycle integrator 29 which will be described in connection with FIG. 2. The integrator 29 receives a command from signal generator 1 on line 31 for each cycle of the reference signal produced by signal generator 1. On this command signal the integrator 29 releases on lead 30 a DC voltage proportional to the average phase error of the previous cycle. The phase error voltage on line 30 is fed to time-word control 34 for the purpose of advancing or delaying the time-word in the computation of the driver sweep signal. The time-word for the driver sweep is fed to signal generator 1 by lead 35. The time-word for the reference sweep is fed to signal generator 1 by lead 33.

Figure 2:
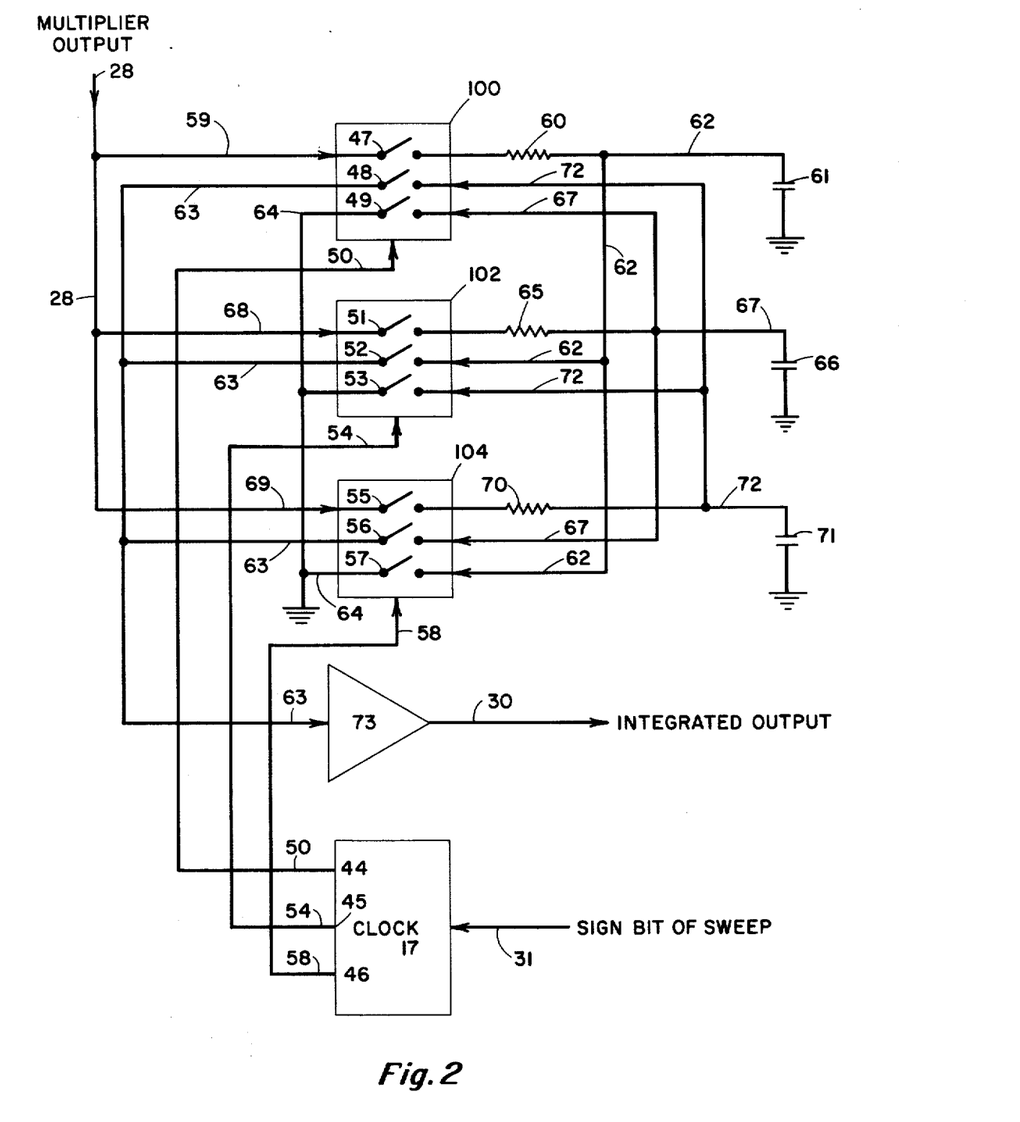
FIG. 2 is a circuit diagram of the integrator which takes the output of the multiplier and forms a signal to the time-word control.

FIG. 2 shows generally the single cycle integrator 29. The input to the integrator is by means of the line 28 coming from the multiplier 27. The integrated output goes by line 30 to a time-word control and the sign bit of the reference sweep comes by line 31 from the signal generator.

The sign bit represents the polarity of the reference signal. The signal generator 1 clocks, or drives, a three stage ring counter 17, which is well known, through lead 31. Pulses are generated successively on outputs 44, 45 and 46. The duration of each pulse being one cycle of the reference sweep. There are three groups of switches, or relays 100, 102, 104 each of which are driven in sequence from terminals 44, 45 and 46 by way of leads 50, 54, and 58, respectively. On the first clock signal received by line 31 relay 100 closes due to the pulse on line 50 from terminal 44. Thus switches 47, 48 and 49 close.

Although the action is similar to a relay closure, and a relay could be used, except that it must be a high speed relay, in practice electronic switches will be used so that a control voltage or pulse on line 50 will close the corresponding switches 47, 48 and 49. Such electronic switches such as F.E.T. switches are well known in the art. Similarly a control pulse on line 54 will operate the second group of three switches, 51, 52 and 53 and a third pulse on line 58 will operate switches 55, 56, 57.

With a signal on line 50, switches 47, 48 and 49 close. The multiplier output on line 28 goes through switch 47 through resistor 60 to capacitor 61 to ground. Resistor 60 and capacitor 61 form an integrator. At the end of the pulse generated at output 44 capacitor 61 is charged to a voltage which is proportional to the integral or average voltage value of the multiplier output 28 for the first cycle of the sweep. During the second cycle of the sweep the pulse on output 45 operates switch 52. This takes the stored voltage on capacitor 61 by means of line 62 through the switch 52 and line 63 to the amplifier 73 and out on line 30 to the time work control 34.

During the third cycle of the sweep the pulse is now on terminal 46 which closes the third group switches 104 and switch 57 connects line 62 which is the terminal of the capacitor 61 to line 64 to ground. This shorts out the capacitor and puts it in condition for the fourth cycle, when terminal 44 will again have the pulse and the capacitor 61 will be used as an integrator through switch 47.

In a similar manner the three sets of switches successively carry out the steps which have been outlined above, using successively three different integrator circuits, each of which are used as an integrator on one cycle, are read on the next cycle, and shorted on the third cycle. At any one time there is only one integrator being used as an integrator, and there is only one integrator transmitting its voltage to the time-word control, and there is only one integrator being grounded in preparation for the next cycle.

The pulse coming in on line 31 from the signal generator 1 is set to operate once each cycle perhaps at the first zero crossing when the voltage increases. It is, of course, possible to have the period of integration reduced, say to a half cycle, or increased to two cycles, or more, as desired.

Figure 3:
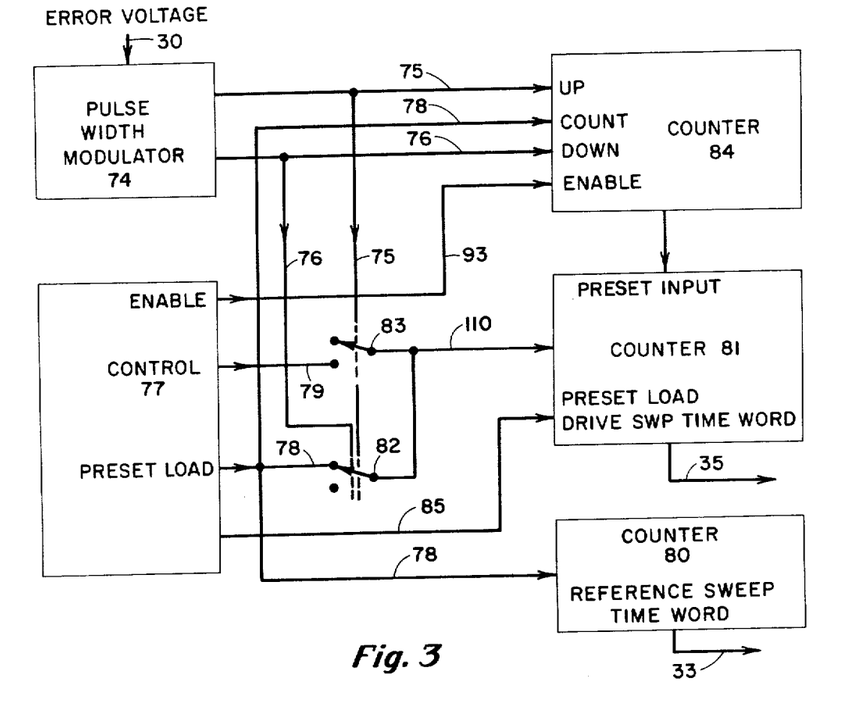
FIG. 3 is a circuit diagram of the time-word control unit which translates the integrated signal into an advance or delay in the time word sequence.

FIG. 3 shows a schematic circuit of the time-word control 34. The voltage from the integrator 29 appears as a DC voltage on line 30. This controls a pulse width modulator 74 which will be described in greater detail in connection with FIG. 6. The output of the modulator 74 is a pulse on either line 75 or 76, the time duration of the pulse being proportional to the magnitude of the DC voltage on the line 30, which is the error voltage from the multiplier 27 and integrator 29. This pulse is a function of the phase relationship between the reference sweep on lead 25 and the base plate signal on the lead 26, of FIG. 1. If the base plate lags the reference, the pulse width modulator generates a pulse on line 75. On this line 75 the width of this pulse being proportional to the amount of phase lag. If the base plate signal on lead 26 leads the reference signal on lead 25 the pulse width modulator 74 generates the pulse on line 76. The width of this pulse is proportional to the amount of phase lead.

Control circuit 77, which will be described in greater detail in connection with FIG. 7, generates a 1 MHZ clock signal on line 78 and a 2 MHZ clock signal on line 79. The clock signal on line 78 drives counters 80. The 16 bit output from counter 80 forms the time words used in computing the reference sweep and is fed to signal generator 1 by lead 33. In the absence of phase error voltage, the clock signal on line 78 also drives counter 81.

The 16 bit output of counter 81 forms the time words used in computing the drive sweep and is fed to signal generator 1 by lead 35. In this case the time-words from counters 80 and 81 are identical, resulting in no phase difference between the drive sweep and the reference sweep. A pulse on line 76 indicating an early base plate phase operates logic switch 82 removing the clock source from the counter 81 for the duration of the pulse. Since counter 81 has received fewer clock pulses than counter 80 its time-word is lower in value than the time-word from counter 80 and the drive sweep lags the reference sweep.

Correspondingly, a pulse on lead 75 indicating a late base plate phase operates logic switch 82 and 83 removing clock source on line 78 from counter 81 and applying clock source on line 79 in its place for the duration of the pulse.

The time clock on line 79 is 2 MHZ whereas the clock time on line 78 is only 1 MHZ. Thus, counter 81 has received more clock pulses than counter 80. Its time-word is greater in value than the time-word from counter 80 and the drive sweep will lead the reference sweep.

During the first 0.5 second of each sweep, control circuit 77 enables counter 84 by lead 93. Pulses on line 75 cause counter 84 to count up at the 1 MHZ rate, and pulses on line 76 cause counter 84 to count down at a 1 MHZ rate. As a result counter 84 accumulates the difference between the number of pulses received by counters 81 and 80 during the first 0.5 second of the sweep. Counter 84 then contains a time-word equivalent to the amount that the time-word from counter 81 was changed during the first half second of the sweep.

Control circuit 77 generates a preset load on lead 85 prior to the beginning of the next sweep which loads the contents of counter 84 into counter 81. Therefore, the next drive sweep starts with the same amount of time correction that was generated during the first 0.5 second of the previous sweep.

Figure 4:
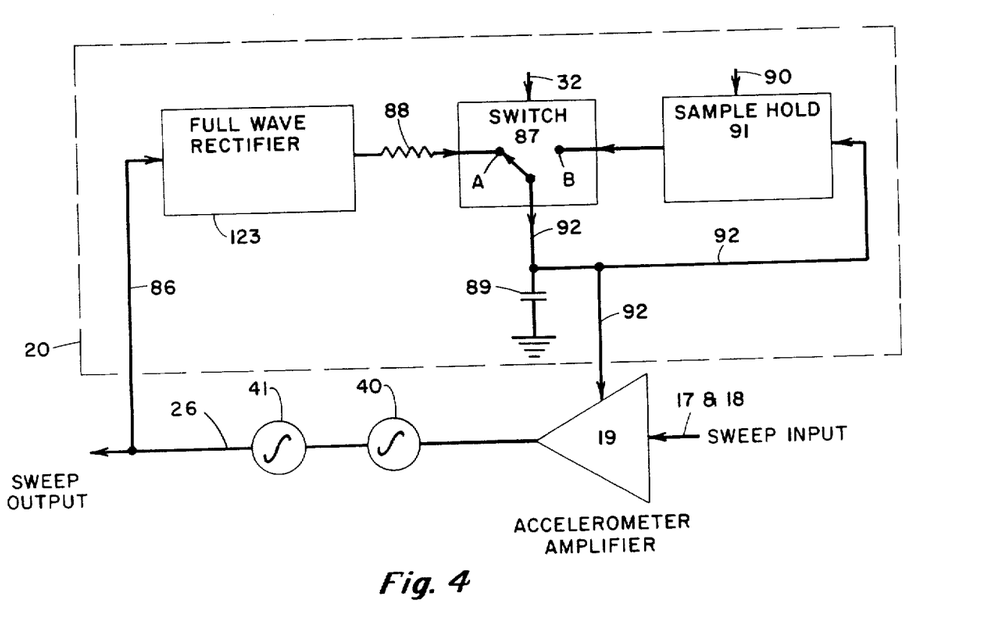
FIG. 4 is a schematic diagram of the automatic AGC preset.

Referring now to FIG. 4 which shows the automatic AGC preset 20. The output of accelerometer amplifier 19 is fed to full wave rectifier 123 by leads 26 and 86. The full wave rectifier 123 generates a pulsating DC, the average value of which is proportional to the magnitude of the output of accelerometer amplifier 19.

Switch 87 is operated by the sweep logic signal on line 32 which closes the switch to position A during the sweep and to position B between sweeps. During the sweep the pulsating signal from full wave rectifier 123 is filtered by resistor 88 and capacitor 89. The voltage on capacitor 89 controls the gain of accelerometer amplifier 19 through lead 92 in such a way as to maintain a nearly constant output level.

The signal from signal generator 1 on line 90 switches the sample hold device 91 to the sample mode during the first 0.5 second of the sweep. The input of sample hold 91 stores the AGC control voltage that was valid at the 0.5 second point in the sweep. This is a good approximation of the control voltage needed at the beginning of the sweep. At the end of the sweep switch 87 is operated to position B so capacitor 89 is charged to the voltage stored in sample hold 91. At the beginning of the next sweep when switch 87 is operated to position A capacitor 89 holds the sample hold voltage until the voltage from the full wave rectifier 123 can charge the capacitor 89, maintaining AGC loop control. The system seeks its own proper initial control voltage using the value obtained under AGC loop control at 0.5 seconds into the current sweep as the initial value of the next sweep.

In FIG. 1 the second accelerometer 38 is mounted on the base plate 5 for the purpose of sampling the acceleration of the base plate to prove the accuracy of the system. The signal from accelerometer 38 is fed to integrator 40 and 41 respectively by lead 39. Integrator 40 converts the measurement of acceleration of the base plate to a voltage representative of the velocity of the base plate. In the same manner integrator 41 converts the velocity representation to a displacement representation. The displacement signal from the integrator 41 is fed to radio 37 by lead 43 and switch 42. The signal may be transmitted to another remote location for comparison with a remotely generated reference sweep or recorded on magnetic tape, etc.

In the description so far the signal generator 1 has not been described in great detail but will be described further in connection with FIG. 5. The time-word control 34 is shown in considerable detail in FIG. 3, and described in connection therewith. In FIG. 3 there are a number of boxes which need some further explanation. The pulse width modulator 74 will be described in more detail in connection with FIG. 6 and the control box 77 will be described in greater detail in connection with FIGS. 7 and 8. The counters 84, 81 and 80 are standard items of commerce and may be purchased on the market. For example, the Radio Corporation of America manufactures many types of integrated circuits such as their COS/MOS presettable up/down counter, catalog numbers CD4029AD, CD4029AE and CD4029AK. These units have been used in this application and since they are fully described in the literature, need no further detailed explanation.

Figure 5:
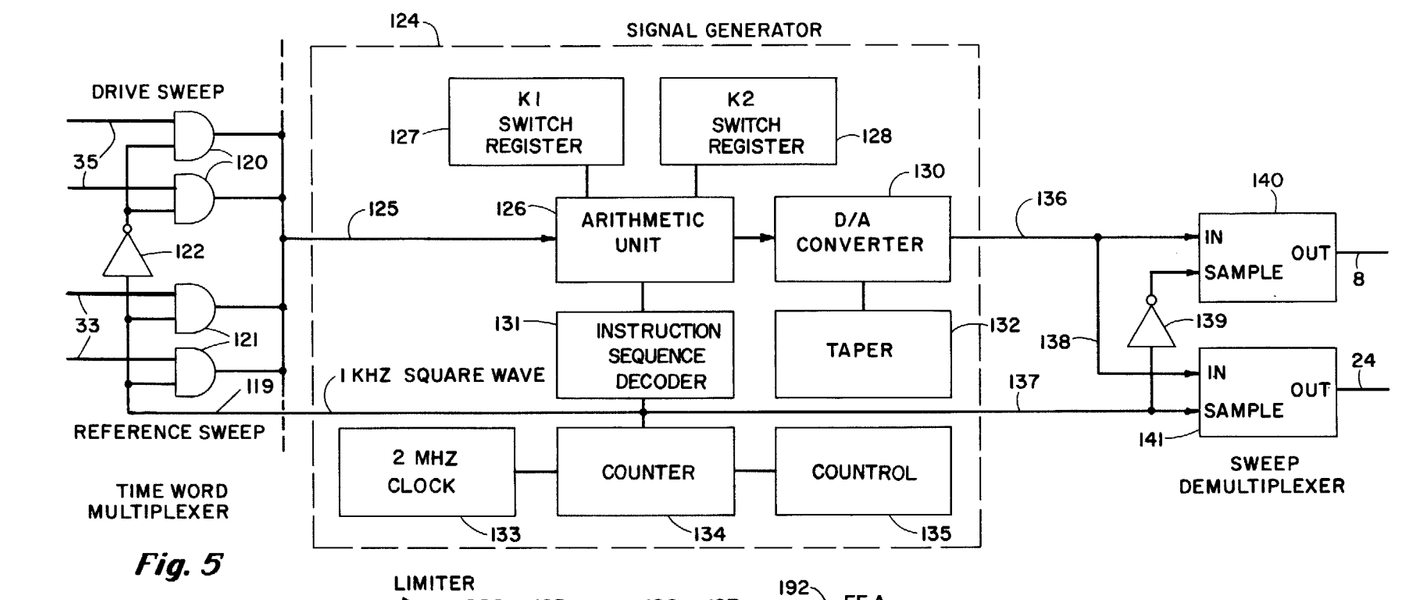
FIG. 5 is a schematic diagram of the signal generator.

FIG. 5 provides additional details regarding the signal generator 1 of FIG. 1. However, there still is some detail not shown but is well known in the art.

The signal generator outlined in the dashed line 124 is basically an arithmetic computer for calculating successive digital values at equal intervals of time, of the sweep signals. The arithmetic unit 126 feeds a digital to analog converter 130 to provide an analog output on line 136. Various other registers and oscillators, etc., are required in this process such as a K1 switch register 127, K2 switch register 128, instruction sequence decoder 131, taper generator 132, 2 MHZ clock 133, counter 134 and control 135.

Examples of this type of digital calculator for computing the time function sweeps have been shown by a number of operators in the seismic business, so that the principles are well known and further detail is not required. For example, see U.S. Pat. No. 3,739,870. However, because the time required to make a calculation for the sweep function is so short, it is possible to sequentially apply two sets of inputs to the signal generator and retrieve sequentially two sets of outputs corresponding, to the two sets of inputs. This is accomplished by the multiplexing feature of the signal generator shown in FIG. 5.

There are a plurality of AND gates 121 fed by inputs from lines 33 which go by way of line 125 to the arithmetic unit 126. There are also a second set of AND gates 120 which are controlled by the signal on lines 35 which also go to the arithmetic unit. The second inputs to the AND gates 120 and 121 are controlled by the voltage on line 119 which is a 1 KHZ square wave. There is an inverter 122 connected between the two sets of gates so that when the voltage is positive on lead 119 one set of gates is enabled and when the voltage is negative, the other set of gates is enabled, and so on.

Similarly, there are two sets of outputs, namely, on leads 136 and 138. These lead to two amplifiers 140 and 141 each taking the output on line 136 from the arithmetic unit 126 and D/A converter 130. Normally, one or the other of the two amplifiers 140, 141 is enabled by the voltage on line 119 which is carried by lead 137 directly to the amplifier 141, and through inverter 139 to the amplifier 140. Therefore, as one set of gates 120 or 121 is enabled similarly, and simultaneously, one amplifier 140 or 141 is enabled so that the output on lead 8, for example, is in accordance with the signal coming in on lead 35 while the output on lead 24 corresponds to the signal input on lead 33. Therefore, a single arithmetic unit, by this means, is used with multiplexing, to provide both of the sweeps, the reference sweep and the drive sweep, in accordance with the time-words which are fed in on leads 35 and 33.

Figures 6, 7, 8:
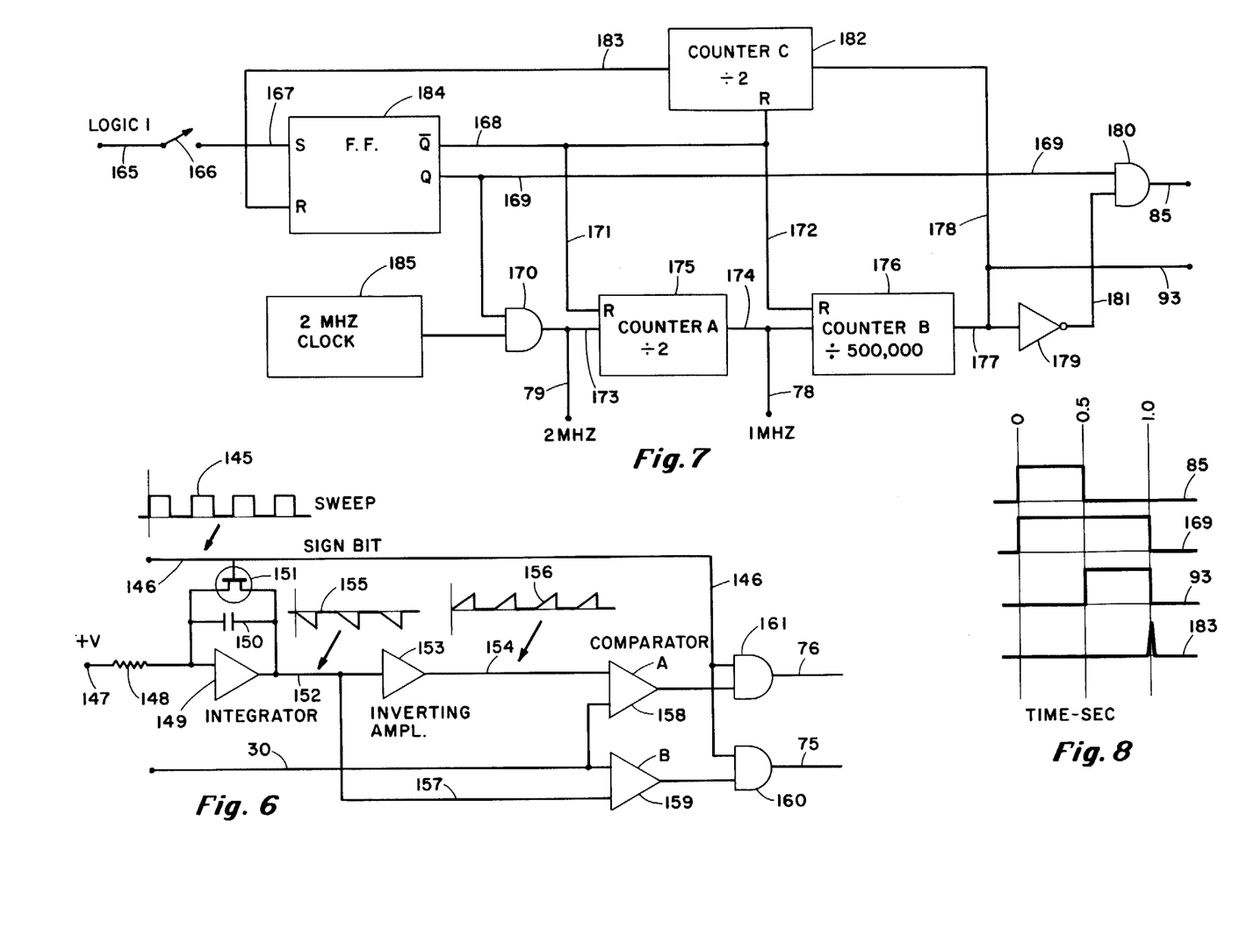
FIG. 6 describes a pulse width modulator.
FIG. 7 is a counter control means.
FIG. 8 illustrates the signals generated in FIG. 7.

Referring to FIGS. 3 and 6, the pulse width modulator is fed by a signal from lead 30. This is a DC voltage, the polarity of which indicates a phase-lead or a phase-lag of the base plate accelerometer, with respect to the reference signal respectively. This voltage is converted in the pulse width modulator, to two sets of square wave pulses, one of which is activated by a lead, or plus signal, and the other which is activated by a lag, or a minus signal.

In FIG. 6 a schematic diagram is shown of the pulse width modulator. This consists basically of an integrator 149 which is fed with voltage from source 147 through resistor 148. A feedback loop including capacitor 150 becomes charged up, causing the output voltage on lead 152 to be depressed in accordance with the sawtooth diagram 155. The sign bit of the reference sweep shown in square wave as 145 is impressed on line 146. Once each cycle the capacitor 150 is discharged by FET 151 which is controlled by signal on line 146. The signal on 152 also goes to an inverting amplifier 153 whose output is 154 and this inverts the sawtooth signal 155 to the form 156.

There are two comparator amplifiers A and B, indicated by the numeral 158 and 159. One carries the negative signal 155 over lead 157 and the other carries the positive signal 156 over lead 154. The feedback error signal on lead 30 goes to both of the comparator amplifiers. If at any instant the input voltage is positive, indicating phase lead, comparator A generates an output pulse to gate 161 until the positive going sawtooth is more positive. If the input voltage is negative, indicating phase lag, comparator B generates an output pulse to gate 160 until the negative-going sawtooth 155 is more negative, then the pulse drops to zero. The gates 161 and 160 lock out the false pulse present during the half cycle that the integrator is reset by the FET switch 151.

Thus once each cycle there is a pulse generated either by comparator A or comparator B, the length of the pulse being a measure of the DC error voltage. The particular comparator producing a pulse is dependent on whether the voltage on leads 30 is plus or minus. The outputs of gates 161 and 160 go to leads 76 and 75 of FIG. 3 and control the counters 84, 81 and 80 as indicated above.

FIG. 7 indicates in schematic form the content of the control 77. This includes an input flip flop 184 which is fed with a logic 1 signal applied to a start switch 166. This logic 1 signal on input lead 167 sets the flip flop 184 and puts a logic 1 signal on line 169 which goes to gate 170 and enables that gate to pass the 2 MHZ clock signal from clock 185. This puts a 2 MHZ signal on lead 79 of FIG. 3 and also operates the counter A, numeral 175, which is a divide by 2 counter. The output on lead 174 is therefore a 1 MHZ signal which goes by lead 78 of FIG. 3 to a counter B, 176 which counts up to 500,000 and outputs a pulse on line 177, after this count is completed.

From the time that the logic 1 signal is placed on the flip flop 184 the logic 2 is placed by lead 169 on the gate 180 and a logic 1 is on lead 181, therefore the gate 180 passes a logic 1 signal on lead 85 to enable the counter 84. At the end of one-half second when the pulse appears on lead 177 the inverter 179 disables the gate 180 and the enable voltage on line 85 is removed. The pulse on lead 177 goes to counter C which is a divide by 2 counter, so that at the end of 1 second a pulse goes from counter C, by lead 183, to the reset R on flip flop 184. This resets the flip flop and stops the action. At the same time counters A, B and C are also reset.

In FIG. 8 is given a brief resume of the voltages appearing on lead 85, 93, 169, and 183. The voltage on 85 exists for only one-half second as shown by the time scale 0, 0.5, 1.0 second. The positive voltage on lead 169 lasts for one full second. The voltage on lead 93 is positive during the second half second and at the end of the first full second the reset pulse 183 occurs.

In FIG. 1 the process of generating the feedback error signal was shown to be effected by multiplier 27. This had two input voltages. One was the reference sweep which came from the signal generator by lead 24 to the phase correction network 23 and lead 25. The other time function was the output of AGC amplifier 19 through the two integrators 21 and 22, via lead 26. Normally these two functions would be similar but 180° out of phase. These two analog signals would then be multiplied in the multiplier 27. The output on line 28 would be added for one cycle in the integrator 129. The resulting DC voltage would be outputed by lead 30 to the time word control.

Figure 9:
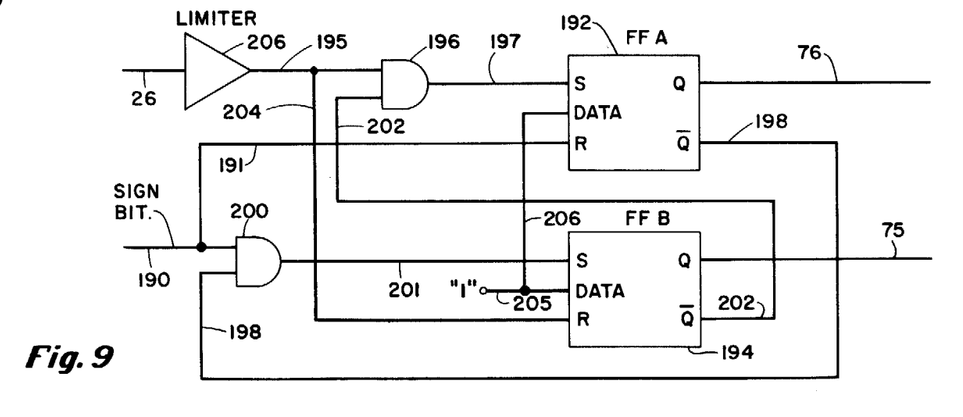
FIG. 9 illustrates a second embodiment of an error signal generator.

This is a very common way of determining from the input sensors the error signal derived from the phase difference between the vibrator output and the reference sweep. However, there is an alternate method for determining the error signal, given the accelerometer AGC amplifier 19 integrated output and the reference sweep. This is shown in FIG. 9.

The input on lead 26 goes to a hard limited amplifier, which is a high gain amplifier which converts the AC signal on its input to a square wave signal having the same zero crossing times. Thus a square wave passes down lead 195 which is synchronous in phase with the incoming sine wave signal on lead 26. This square wave, which represents the phase of the vibrator output as determined by the sensors 6 or 7, passes through gate 196 which is enabled because the second lead 202 is connected to the $\bar{Q}$ output of flip flop 194. Thus a logic 1 output on lead 197 sets the flip flop A, numeral 192, and puts a logic one signal on lead 76. This voltage stays on lead 76 until the voltage on 190, which is the square wave of the sign bit of the reference signal becomes positive. When this voltage carries a logic 1 signal, this goes by lead 191 to reset the flip flop A which drops the voltage on lead 76 to logic 0. In other words, if the base plate signal on lead 26 leads the reference, the flip flop A will be set by the base plate signal, or the AGC amplifier output, and it will stay positive on lead 76 until the phase of the reference signal changes from a negative to a positive signal. Conversely, if the sign bit signal on lead 190 becomes positive before the base plate signal, which means the base plate is lagging, then gate 200 is enabled, which sets the flip flop B, 194 which puts a positive pulse on lead 75. This stays positive until the output of limiter 206 becomes positive. When lead 195 shows a logic 1 the flip flop B is reset, and the square wave pulse on 75 drops to logic 0, until the next cycle. Thus by providing two square wave signals which represent precisely the zero crossing times of the accelerometer amplifier signal on lead 26 and the reference signal on lead 24 the circuit of FIG. 9 will create square wave pulses on either lead 76 or 75 depending on which of the two signals becomes positive before the other. These signals remain positive until the second voltage becomes positive so that the time duration of the pulses on line 76 and 75 is a direct measure of the phase lead or lag, as the case may be. Thus the circuit of FIG. 9 is a direct replacement for the phase correction network 23, the multiplier 27 and the integrator 29 and the pulse width modulator 74 of FIG. 3.

Radio 37 is shown in FIG. 1 with an input on line 43 and an output on line 36 in addition to the antenna lead. While the use of the radio 37 is not required in carrying out this invention it may be used to supplement the operation of the equipment by receiving from the antenna a timing pulse on line 36, by means of which the operation of the signal generator can be initiated in synchronism with the operation of other vibrators. The signal pulse can be of any type and can be utilized by means of well known gating means to initiate the generating or the passage of the time-words reaching the signal generator by means of leads 35 and 33 from the time-word generator of FIG. 1, or by other well known means.

Also, as an optional feature, the signal from the sensor 38 on the base plate 5 goes by lead 39 to integrators 40 and 41 so that the output on lead 43 after passing through the switch 42 would be a facsimile of the seismic signal generated by the base plate in the earth. This signal on line 43 could go to the radio to be transmitted to the recording location for use in any way that might be desired.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. An electrically controlled vibrator system in which a reference analog signal, or sweep, of selected frequency content and selected time duration is used to control a vibrator to create a seismic output signal, comprising:
   a. a reference digital signal generator means for producing a reference train of time-spaced digital signals of selected magnitude, responsive to a corresponding first train of time-spaced time-word signals;
   b. a driver digital signal generator means for producing a driver train of time-spaced digital signals of selected magnitude responsive to a corresponding second train of time-spaced time-word signal;
   c. digital to analog conversion means to convert said reference digital signals to a reference analog signal, and to convert said driver digital signals to a driver analog signal;
   d. means to control and drive said vibrator responsive to said driver analog signal;
   e. means to derive an output feedback signal indicative of said seismic output signal from said vibrator; and
   f. means responsive to the phase of said output feedback signal with respect to the phase of said reference analog signal to shift said second train of time-word signals with respect to said first train of time-word signals;
   whereby said driver analog signal will be correspondingly shifted in phase with respect to the phase of said reference analog signal.

2. The system as in claim 1 in which said means to derive said output feedback signal comprises motion detection means on the base plate of said vibrator.

3. The system as in claim 2 in which said motion detection means comprises accelerometer means.

4. The system as in claim 1 in which said means to derive said output feedback signal comprises displacement detection means between the piston and reaction mass of said vibrator.

5. The system as in claim 1 in which said means to derive said output feedback signal comprises a function of said accelerometer means and said displacement detection means.

6. The system as in claim 1 in which said means to shift said second train of time-word signals of said second driver signal generator includes:
   a. means responsive to said output feedback signal and said reference analog signal to form a phase error signal, and
   b. means responsive to said phase error signal to shift said second train of time-word signals.

7. The system as in claim 6 in which said means to form a phase error signal includes multiply means.

8. The system as in claim 7 including phase correction means.

9. The system as in claim 8 including integrator means.

10. The system as in claim 9 in which said integration is made over an interval of an exact multiple of one cycle.

11. The system as in claim 10 including means to store said integrator output derived in a first integrating period and to apply the stored output during the succeeding integrating period to control said second time-word signal of said driver generator.

12. The system as in claim 1 in which said means to shift said second train of time-word signals of said driver signal generator comprises:
   a. means to form a first square wave from said output feedback signal;
   b. means to form a second square wave from said reference signal; and
   c. means responsive to the times of occurrence of the zero crossing times of said first and second square waves to alter the timing of said second train of the time-word signals of said driver signal generator.

13. The system as in claim 1 including means to transmit a signal corresponding to the output of said vibrator to a separate location.

14. The system as in claim 1 in which said reference and driver digital signal generator means comprises:
   a. digital signal generator means, and
   b. multiplex means to control the input and output of said generator means sequentially between two sets of input and output means.

15. The system as in claim 1 in which said digital signal generator means comprises digital arithmetic means for calculating said train of time-spaced digital signals responsive to said train of time-spaced time-word signals.

16. The system as in claim 1 in which said means to derive said output feedback signal includes:
   a. automatic gain control amplifier means; and
   b. preset means for said automatic gain control amplifier means;
   c. said preset means effective from the start of a reference analog signal to a selected time after the start of said reference analog signal;
   d. said preset means responsive to the automatic gain control signal developed during the preceding reference analog signal or sweep.

17. The system as in claim 1 in which said means responsive to said phase error signal to shift said train of time-word signals comprises:
   a. first clock means at frequency F;
   b. second clock means at frequency 2F;
   c. pulse width modulator means responsive to said phase error signal;
   d. first counter means responsive to said first clock means for generating said first train of time-word signals;
   e. second counter means responsive to said first clock means, said second clock means, and said pulse width modulator for generating said second train of time-word signals.

18. The system as in claim 17 including counter means to indicate the accumulated difference in time-words between said first and second trains of time-words for a selected length of time, means to store the accumulated value of said difference from the previous sweep, and means to algebraically add the accumulated difference in time words of the current sweep to said stored value, to preset said second counter means prior to initiating the next succeeding sweep.

19. The system as in claim 17 in which said second counter means is connected to said first clock, except for the duration of the pulses from said pulse width modulator, when said second counter is connected to said second clock for the duration of said pulses when said output signal lags said reference sweep, and is disconnected from both clocks for the duration of said pulses when said output signal leads said reference sweep.

20. In an electrically controlled vibrator system in which a reference analog signal, or sweep, of selected frequency content and selected time duration is used to control a vibrator to create a seismic output signal the method of operation comprising:
  a. generating a reference train of time-spaced digital signals of selected magnitude responsive to a corresponding first train of time-spaced time-word signals;
  b. generating a driver train of time-spaced digital signals of selected magnitude responsive to a corresponding second train of time-spaced time-word signals;
  c. converting said reference digital signals to a reference analog signal and converting said driver digital signals to a driver analog signal;
  d. controlling and driving said vibrator responsive to said driver analog signal;
  e. deriving an output feedback signal indicative of said seismic output signal from said vibrator; and
  f. responsive to the phase of said output feedback signal with respect to the phase of said reference analog signal, shifting said second train of time-spaced, time-word signals of said driver signal generator with respect to said first train of time-spaced time-word signals of said reference signal generator;

whereby said driver analog signal will be correspondingly shifted in phase with respect to the phase of said reference analog signal.

21. The method as in claim 20 including the additional steps of shifting said second train of time-word signals to a later value when said output signal leads said reference signal and shifting said second train of time-word signals to an earlier value when said output signal lags said reference signal.

* * * * *